C. E. R. SCHNEIDER.
APPARATUS FOR SHOWING PICTURES IN RELIEF.
APPLICATION FILED OCT. 5, 1914.

1,124,665.  Patented Jan. 12, 1915.

WITNESSES:

INVENTOR,
Chas. E. R. Schneider,
BY
ATTORNEY.

UNITED STATES PATENT OFFICE.

CHARLES E. R. SCHNEIDER, OF NEW HAVEN, CONNECTICUT.

APPARATUS FOR SHOWING PICTURES IN RELIEF.

1,124,665.

Specification of Letters Patent.

Patented Jan. 12, 1915.

Application filed October 5, 1914. Serial No. 865,214.

*To all whom it may concern:*

Be it known that I, CHARLES E. R. SCHNEIDER, a citizen of the United States of America, and resident of New Haven, in the county of New Haven and State of Connecticut, have invented certain new and useful Improvements in Apparatuses for Showing Pictures in Relief, of which the following is a full, clear, and exact description.

This invention relates to improvements in apparatuses for the exhibition of pictures for amusement purposes, the object thereof being to acquire visual effects of great interest and attractiveness especially occasioned by imparting the aspect of bulk and reality to the projected image and the distance of such image relatively to the showing which is also made, apparently as a background, of a landscape or accessories.

The invention as carried out on a stage in a theater, playhouse or hall comprises a transparent plate mounted at an inclination to the line of vision of the people in the audience, a screen behind the plate and a projecting machine or machines, such as a moving picture machine or a stereopticon, or both, to be alternately or simultaneously used for the projection of the moving or still pictures.

The apparatus, furthermore, comprises a sheet such as canvas or other suitable material having scenery or accessories painted or depicted thereon, such sheet having its location above the glass plate, and by reason of being brightly illuminated is operable to cast the reflection of the landscape scenery or accessories onto the glass plate.

The invention is described in conjunction with the accompanying drawings and is set forth in the claims.

Figure 1:
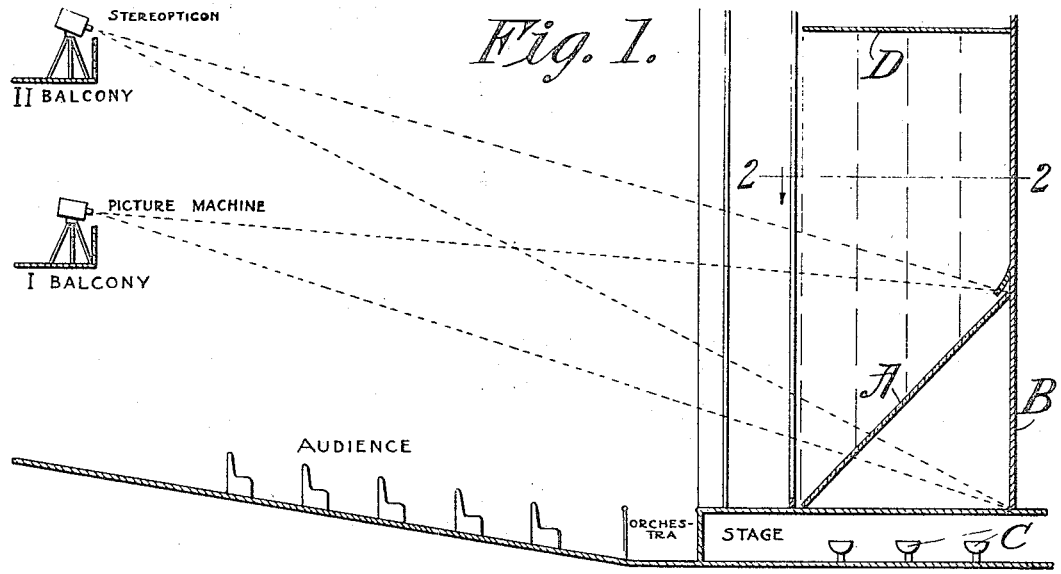
Figure 2:
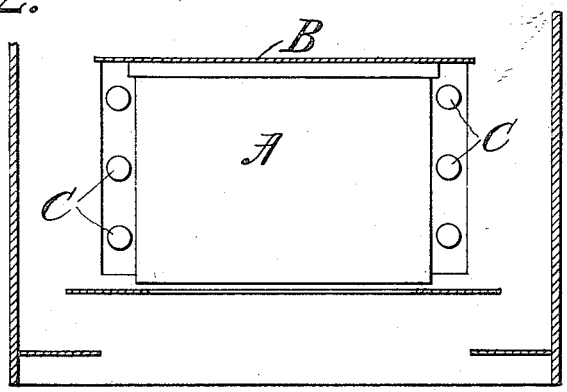
Figure 3:

In the drawings:—Figure 1 is a sectional elevation, more or less diagrammatical, showing the preferred combination and arrangement of parts for acquiring the desired visual and illusory effects. Fig. 2 is a plan view as seen below the line 2—2, Fig. 1. Fig. 3 is an inverted plan view of an overhead landscape bearing sheet.

A transparent plate A of glass or other suitable material is set on the stage illuminated by the foot lights as usual facing the audience at an angle of about 45 degrees and is suitably forward of a back screen B which advantageously may be of white canvas or white paper.

Directly above the inclined glass plate A is a sheet D more or less nearly horizontal, having painted or otherwise produced thereon, in colors, a landscape, scenery or accessories, and this by reason of the spot lights C concentrated thereon is very brightly illuminated, and is reflected as a still picture on the glass plate. The illumination from the lights C being concentrated and directed onto the overhead landscape sheet leaves the back screen relatively darkened. The glass is so set behind wings or flies that the edges thereof are not observable and the glass is really not perceptible to the audience, and the usual proscenium or foot lights because of the wings or flies impart to the plate A and the back screen B a lessened or comparatively obscured illumination.

The films or plates employed in the projecting machine for causing the image to be observed, as hereinafter set forth, are made opaque throughout with the exception of the image so that in the projection little or no light, excepting that by which the image itself is projected, is thrown through the inclined glass plate A onto the back screen B; and one who would peer behind the inclined glass plate would perceive the image standing brightly on the forward side of the background screen, all portions of the surface of which other than that comprised in the projected brightly appearing image being non-illuminated.

The moving pictures from a projecting machine, or still pictures from a stereopticon or suitable projecting apparatus therefor are projected through the glass onto the back screen, creating the illusion, viz: The landscape which is actually reflected from above onto the glass and observed therefrom appears to be the rear of the location of the glass while the moving picture image or still stereopticon image which is actually thrown upon and seen on the back screen appears to be at the location of the glass, that is forward of the reflected still picture, scenery or accessories; but the principal effect and the one of greatest importance and value inherent in this invention consists in the "plastic effect" that is the projected moving picture or stereopticon image stands out in relief, the same as observable in a stereoscope. This is accounted for by reason of the distance between the inclined glass showing the landscape and the back screen on which the image is actually reflected, and which being viewed through the glass, acquires the aspect of bulk, relief and distance.

The line of projection from the moving picture machine or from the stereopticon may be from a level just above the stage or from any of the galleries no matter how high, the angle of projection through the glass being immaterial; such height of projection may be on any lateral slant, and the apparent distance of the image, as viewed, seemingly forward of the landscape or still picture will be greater or less according to the height at which the ceiling sheet bearing the painted landscape is above the top of the inclined glass.

I claim:—

1. In an apparatus of the character described, in combination, a transparent plate mounted at an incline to the line of vision of an observer, a screen behind the plate and a projecting machine by which a picture is thrown through the transparent plate and onto the screen.

2. In an apparatus of the character described, in combination, a transparent plate mounted at an incline to the line of vision of an observer, a screen behind the plate, and a projecting machine by which a picture is thrown through the transparent plate and onto the screen, and a sheet having a landscape or accessories thereon arranged at an angle to the transparent plate and from which the reflection of the picture thereon is thrown onto said plate.

Signed by me at Springfield, Mass., in presence of two subscribing witnesses.

CHARLES E. R. SCHNEIDER.

Witnesses:
HERBERT E. RUMRILL,
WM. S. BELLOWS.